United States Patent [19]
Panuska et al.

[11] Patent Number: 5,015,063
[45] Date of Patent: May 14, 1991

[54] OPTICAL FIBER CABLE CORE

[75] Inventors: Andrew J. Panuska, Buford; Parbhubhai D. Patel, Dunwoody, both of Ga.

[73] Assignee: AT&T Bell Laboratories, Murray Hill, N.J.

[21] Appl. No.: 427,061

[22] Filed: Oct. 25, 1989

[51] Int. Cl.$^5$ ............................................. G02B 6/44
[52] U.S. Cl. ..................................... 350/96.23; 57/7; 264/1.5; 350/96.34
[58] Field of Search ............... 350/96.10, 96.23, 96.34; 57/6–9, 13–18; 264/1.5

[56] References Cited

U.S. PATENT DOCUMENTS

| | | | |
|---|---|---|---|
| 4,439,007 | 3/1984 | Lazay et al. | 350/96.30 |
| 4,446,686 | 5/1984 | Panuska et al. | 350/96.23 |
| 4,701,016 | 10/1987 | Gartside, III et al. | 350/96.23 |
| 4,723,831 | 2/1988 | Johnson et al. | 350/96.23 |
| 4,826,278 | 5/1989 | Gartside, III et al. | 350/96.23 |
| 4,836,640 | 6/1989 | Gartside, III et al. | 350/96.23 |
| 4,913,517 | 4/1990 | Arroyo et al. | 350/96.23 |

FOREIGN PATENT DOCUMENTS 2551210  5/1977  Fed. Rep. of Germany .

OTHER PUBLICATIONS

Fiber Optic Cable Design, Testing and Installation Experiences, Bark et al., Conference: Proceedings of the 27th International Wire and Cable Symposium, Cherry Hill, N.J., pp. 14–16, Nov. 1978.

Primary Examiner—Akm Ullah
Attorney, Agent, or Firm—Edward W. Somers

[57] ABSTRACT

An optical fiber cable core (20) which is sold to a cable manufacturer for oversheathing or for incorporation into electrical power aerial cables, for example, includes in a preferred embodiment at least one bundle (23) of optical fibers (25—25). The at least one bundle is disposed in a tubular member (30) which is made of a plastic material suitable for use in relatively wide temperature range. The core is manufactured to cause a predetermined excess length of fiber to be disposed in the tubular member. The excess length of each fiber is such that it is sufficient to avoid undue strains on the fiber as the cable core is exposed to the elements and to forces imparted during handling such as during installation. On the other hand, the excess fiber length must not be so great as to result in undue curvature of the fiber or excessive interactive engagement of the fiber with an inner wall of the tubular member. Also, the plastic material of the tubular member must be such that it responds linearly to the application of tensile forces up to a strain corresponding to the excess fiber length at a given temperature.

17 Claims, 3 Drawing Sheets

OPTICAL FIBER CABLE CORE

TECHNICAL FIELD

This invention relates to an optical fiber cable core. More particularly, this invention relates to an assembly of optical fibers which includes a plurality of optical fibers disposed in a tubular member.

BACKGROUND OF THE INVENTION

Optical fiber cables have been in use for communications for some time. The cables which are in use have been provided by a number of different manufacturers, each having its own structural arrangement. Because of the use of glass fibers as the communications medium instead of metallic conductors, it becomes necessary to include strength members in the cables.

In some optical fiber cables, the strength members are disposed centrally of the cable cross section. See, for example, German Offenlegungsschrift No. 25 51 210 in which a plurality of individual tubes are arrayed about a central strength member. Disposed in each so-called loose tube is one or more optical fibers. In such a design, it is typical for the length of the optical fiber generally to equal the length of the tube. In another approach, the strength members are included in a sheath system of the cable. As an example of the latter arrangement, see U.S. Pat. No. 4,826,278 which issued on May 2, 1989 in the names of C. H. Gartside, III, A. J. Panuska, and P. D. Patel. Therein, at least one optical fiber bundle is disposed within a tubular member which may be made of polyvinyl chloride (PVC). The tubular member is enclosed in sheath system elements such as a water blocking tape and an outer jacket. Longitudinally extending strength members are disposed in the outer jacket generally adjacent to the tubular member.

It is commonplace to provide optical fiber cables with optical fibers having a length which exceeds the length of the cable. See for example, U.S. Pat. No. 4,723,831 which issued on Feb. 9, 1988 in the names of B. D. Johnson, W. C. Reed and C. G. Wilson. This is done so that when the cable is handled and routed in tortuous paths during installation, undue strains will not be induced in the fibers. Also, as the amount of excess length increases, the tensile strength needs for the cable are reduced with an accompanying reduction in costs. The excess length of fiber generally has been accomplished by applying predetermined forces to the cable before takeup to stretch the cable sheath components elastically allowing excess fiber lengths to become disposed in each increment of length of the cable as the stretching forces are released and the sheath components return to their unstretched length. As should be apparent, the stretching is caused by controlled forces.

In the prior art, there has been reluctance to use a relatively high excess fiber length. The reason for such reluctance seemed to be the concern that too much excess fiber length results in undesired microbending which leads to increased attenuation.

These considerations relating to bending losses also are important because of additional demands which may be placed on optical fiber assemblies. For example, the core arrangement of the above-identified C. H. Gartside, III, et al. patent has been widely accepted as being suitable for a variety of installations. Accordingly, there is a demand by cable manufacturers for the core itself so that a buyer thereof may add its own sheath system to meet particular needs. If such an optical fiber cable core, as it is referred to commonly in the industry, is to be made available as an end product of a manufacturer, additional requirements must be met. Such an optical fiber cable core must not unduly strain the fibers when the cable core, unprotected by a sheath system, is exposed to a relatively wide temperature range. Also, the tubular member must be capable of providing protection for the optical fibers.

Furthermore, there has been a desire to use optical fiber more widely in aerial installations where right of way already exists. Because of the existence of overhead right-of-way for power lines and the presence of ground wire in overhead transmission, the thought of incorporating optical fibers in composite ground wire has evolved. Here, an optical fiber cable core would be provided by an optical fiber cable manufacturer to a manufacturer of composite ground wire which would incorporate the fiber cable core into the design of the composite ground wire. As should be apparent, an aerial cable is subjected to higher forces caused for example by wind and ice loading, particularly in overhead transmission lines where long spans are involved. Because it is subjected to increased forces, the aerial cable must be provided with sufficient excess fiber length to prevent undue strain.

Such desired uses result in the need for enhanced properties for the optical fiber cable core. What is needed and what seemingly is not available in the art is an optical fiber cable core which is suitable for sale in and of itself. Also, it should be capable of incorporation into a cable package for use, for example, in aerial installations of power lines. Desirably, the sought after optical fiber cable core should retain all the advantageous features of the hereinbefore disclosed C. H. Gartside, III, et al. patented cable but have enhanced features to meet the more demanding uses.

SUMMARY OF THE INVENTION

The foregoing problems of the prior art have been overcome with an optical fiber cable core of this invention. The optical fiber cable core includes at least one optical fiber transmission medium, and preferably, at least one bundle comprising a plurality of optical fibers. The at least one bundle is disposed in a tubular member.

Also, the length of each fiber in each bundle is longer than the length of the tubular member by a desired amount. The amount by which the fiber length exceeds the length of the tubular member is referred to as excess fiber length and is sufficient to prevent undue strains where the cable is subjected to the environment or to forces incurred during handling. On the other hand, the excess fiber length, the cross sectional area of the optical fiber transmission media and the inner diameter of the tubular member are such as to avoid undesirably small radii of the fibers or excess interactive engagement of the fibers with an inner wall of the tubular member, either of which would result in an increase in bending losses. The tubular member is made of a plastic material which is characterized by a relationship between applied tensile forces and strain which is substantially linear up to a strain corresponding to the excess length of the transmission medium at a given temperature.

The optical fiber cable core of this invention may be used in at least several ways. For example, it may become a central portion of an aerial cable which includes electrical power conductors and an outer sheath system. Or it may be sold to an optical cable manufacturer which applies its own design sheath system thereover.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
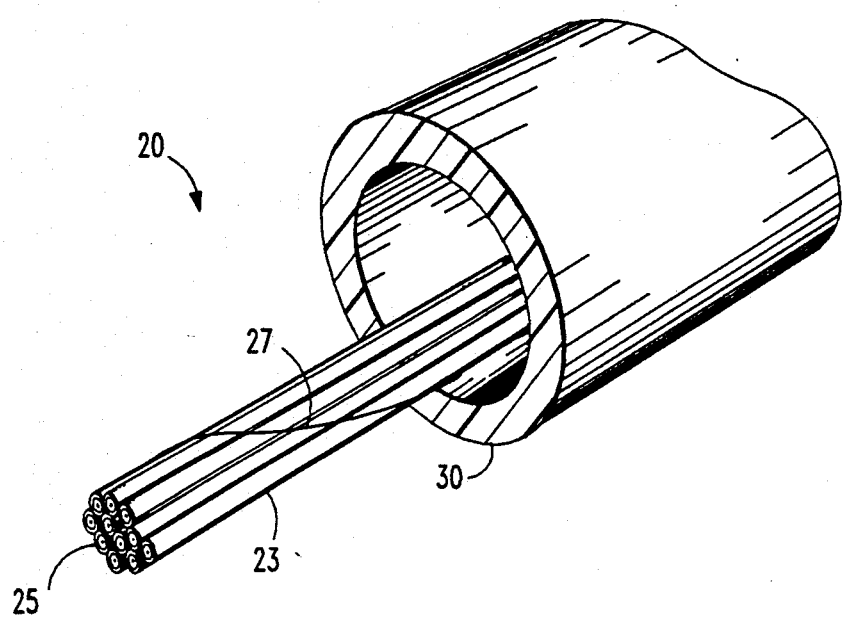
FIG. 1 is a perspective view of an optical fiber cable core of this invention.
Figure 2:
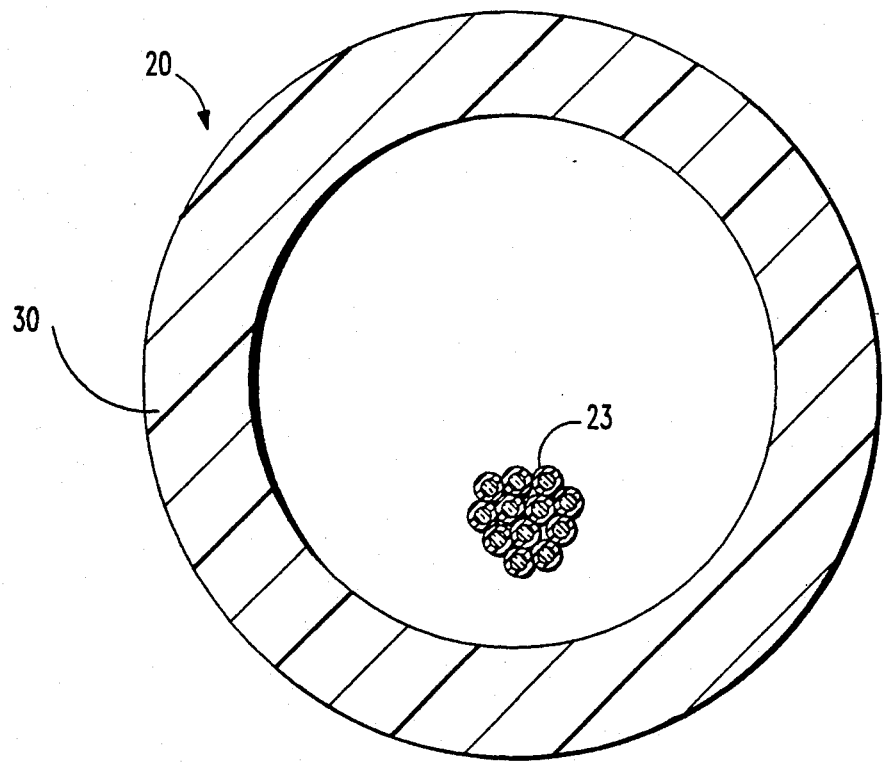
FIG. 2 is an end sectional view of the optical fiber cable core of FIG. 1.

Referring now to FIGS. 1 and 2, there is shown an optical fiber cable core which is designated generally by the numeral 20. The optical fiber cable core includes least one optical fiber 25 and preferably at least one bundle 23 of optical fibers 25—25. In a preferred embodiment, each of the bundles is provided with a binder 27 which is wrapped helically about the plurality of optical fibers.

Figure 3:
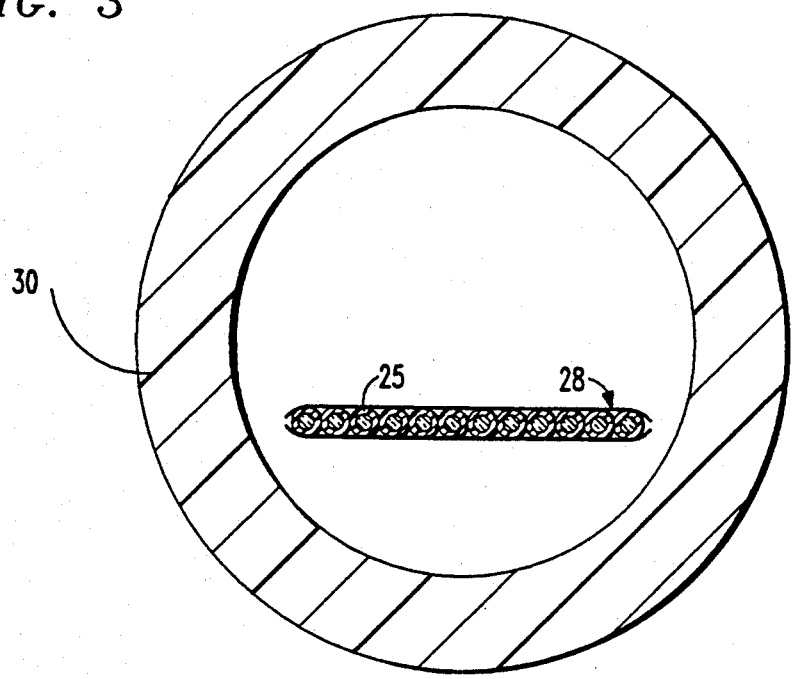
FIG. 3 is an end sectional view of an optical fiber cable core which includes optical fiber ribbons.

The preferred embodiment is shown as having at least one bundle comprising a plurality of optical fibers. It should be realized that instead of bundles of fibers, the cable core 20 may comprise one or more optical fiber ribbons 28—28 (see FIG. 3). Each ribbon 28 may comprise a plurality of optical fibers held between two longitudinal tapes. Or as disclosed in the recent literature, an optical fiber ribbon may comprise a plurality of optical fibers held together in a UV curable matrix material, for example.

Enclosing the optical fiber is a tubular member 30. The tubular member 30 generally is made of a plastic material. In the past, such a tubular member has been enclosed in a sheath system including at least one jacket.

For the optical fiber cable core of this invention, the tubular member 30 is the sole protection for the fibers until the cable core is provided with a sheath system. As a result, the tubular member must be characterized by properties which are enhanced over those of a tubular member protected by additional sheath system components.

An important characteristic of the core of this invention is its packing density. Packing density, $\rho_p$ is defined as the ratio between the cross-sectional area of the optical fibers and any coatings thereon, $n \times a_f$ where n is the number of fibers and $a_f$ is the area of a fiber, and the total cross-sectional are enclosed by the tubular member 30, which area is designated as $a_t$. If the packing density is too high, optical fibers within the core may experience relatively high stress and could break during handling of the cable. This occurs when the packing density is too high, because as with the use of filling materials which are used for water blocking and which yield at a relatively high stress, the optical fiber cannot move sufficiently within the tube to relieve stresses such as would occur in bending. In the prior art, this problem was overcome by stranding individual buffer tubes each of which encloses a fiber or fiber bundle. However, as is well-known, stranding requires a lower processing speed and results in increased costs. Further, such a cable including a plurality of individual buffer tubes results in an increased cable diameter. It has been found that the predetermined value for packing density for optical fiber cable cores of this invention is one that does not exceed about 0.5.

Also, the optical fibers 25—25 are provided with excess length; $\epsilon$. That is, each of the optical fibers has a length ($l_f$) which exceeds the length ($l_t$) of the tubular member 30. The excess fiber length, $\epsilon$, generally is given in terms of percent excess length, $\epsilon(\%) = 100 \times (l_f - l_t)/l_t$. As a result, when the optical fiber cable core is subjected to tensile loadings, the tubular member 30 will elongate before any loads are applied to optical fibers therewithin.

The provision of excess optical fiber length or overstuffing as it sometimes is called must be accomplished bearing in mind two results which may occur. One of these is microbending and the other is called macrobending. A microbend is defined as a small perturbation in the fiber axis that cannot be seen with the unaided eye. This type of bend is only a few nanometers in amplitude and has a period of a fraction of a millimeter. On the other hand, a macroben is a relatively large amplitude perturbation in the fiber axis, i.e., on the order of a few millimeters that can be seen with the unaided eye. Macrobends and microbends have the net effect in causing undesired losses in optical fiber transmission, particularly at lower temperatures such as, for example, $-40°$ C. These bending effects can occur from coating, cabling, installation and temperature, etc.

Care must be taken when providing the excess length of the optical fiber to avoid macrobending and microbending. Excess length of fiber may be provided by causing the fiber to have a helical or sinusoidal configuration along the length of the tubular member. Although it has been stated that the configuration of the fiber in the tubular member 30 may be in a helical or sinusoidal configuration, the inclusion of excess length also may result in a reverse oscillated lay pattern. Fiber undulations are the natural consequence of overstuffing. As a result, the optical fiber can expand or contract when subjected to tensile or compressive forces. Care must be taken when causing the optical fiber to have an undulatory configuration to avoid too small a radius. If the radius is too small, undesirable losses due to macrobending may occur. The undulatory wavelength decreases with increased overstuffing. As more and more fiber is caused to occupy each successive increment of length of the tubular member which has a fixed inner diameter, the fibers assume paths of decreasing radius which can cause macrobends in the fiber and result in unwanted losses.

A further consideration is the inner diameter of the tubular member 30. That inner diameter of course determines the volume available for the optical fibers within the core. Also, the bending radius of the optical fiber may decrease as the inner diameter of the tubular member 30 decreases for the same excess length of fiber. The choice of a relatively small core tube diameter results in a relatively short undulation length, which in turn may result in increased loss.

Further, as more excess length is provided, the optical fibers are urged against the inner wall of the tubular member. When this engagement occurs, the optical fiber inside the coating material may bend. This could cause a relatively small distortion of the optical fiber axis within the coating, causing microbending and leading to loss.

These problems are overcome by considering several factors in arriving at the structural arrangement of the optical fiber cable core of this invention. First, the number of optical fibers to be provided in the cable core and the packing density are established. Also established is the desired excess length of the optical fibers. From this information, a model is used to calculate the inner diameter of the tubular member in order to achieve a predetermined minimum bend radius which results in minimum attenuation.

Usually, the parameters of number of fibers and excess length are given. Once the diameter of the tubular member 30 is known, and the excess fiber length is known and the shape is modeled, the fiber radius is found and from that, the loss is predicted. This approach is based on the recognition that excess length of each fiber, the inner diameter of the tubular member 30, the lay length of each fiber and the bend radius of each fiber are interrelated. Adjustments may be made to ensure that the attenuation is held substantially to a minimum value. It has been determined that the excess length of each optical fiber of optical fiber cable cores of this invention may be as much as about one (1) percent without causing unacceptable losses.

The cable core of this invention is optimized with respect to excess length of fiber which advantageously reduces the strain on the fiber when the cable core is loaded. As a result, a less elaborate sheath system may be used. This has been accomplished by recognizing the interrelationship of a number of factors, namely, the excess length, number and cross sectional area of fibers, inner diameter of the tubular member 30, lay length and minimum bend radius of the optical fibers.

It will be recalled that the tubular member 30 must have strength properties which are enhanced over those of prior art tubular members because it it a stand-alone package until processed subsequently. In the prior art it was not uncommon for the tubular member to be made of polyvinyl chloride (PVC) or polyethylene plastic material. A tubular member which is made of such a plastic material exhibits a force-strain behavior which is linear up to a point and thereafter is non-linear, i.e., substantial elongation occurs without any accompanying substantial increase in force.

For the contemplated uses of the cable core of this invention, it is desired that the tubular member comprise a plastic material which is characterized by a relationship between applied load and strain which is substantially linear over a substantially greater range than for the tubular members of the prior art. Preferably, it is linear up to a strain corresponding to the desired excess length at a given temperature. The strain which corresponds to the desired excess length is equal to the sum of the strain corresponding to an applied load plus compensating strains which include the geometric strain and a strain attributed to temperature. The geometric strain accounts for the fiber being disposed in engagement with an inner portion of the tubular member 30 as the tubular member is advanced around a sheave to elongate the tubular member and thereby allow excess length to be come disposed therein as shown in U.S. Pat. No. 4,446,686 which issued on May 8, 1984 in the names of A. J. Panuska, M. R. Santana, and R. B. Sprow. If the compensating strains were not taken into account, the relaxation of the tubular member following elongation would result in an excess length which is less then that desired. It has been found that a plastic material which is suitable for the tubular member 30 is polybutylene terephthalate (PBT).

The cable core of this invention performs satisfactorily under expected conditions. Under low temperatures, the cable shrinks and the bend radius of the fiber therewithin decreases. Advantageously, the inner diameter of the tubular member 30 is sized such that the minimum bend radius in the worst environment results in an acceptable loss.

The goal of minimal attenuation may be furthered by using depressed cladding optical fiber such as is disclosed in U.S. Pat. No. 4,836,640 which issued on June 6, 1989 in the names of C. H. Gartside, P. Glodis, and P. D. Patel and which is incorporated by reference hereinto.

Figure 4:
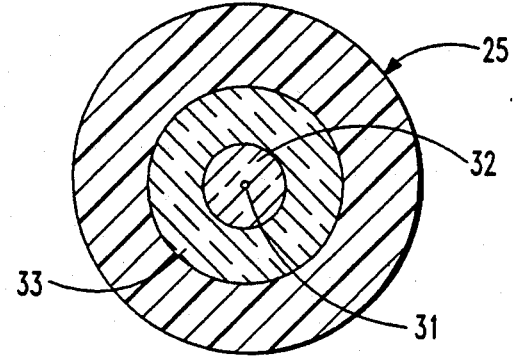
FIG. 4 is an end sectional view of a coated optical fiber.
Figure 5:
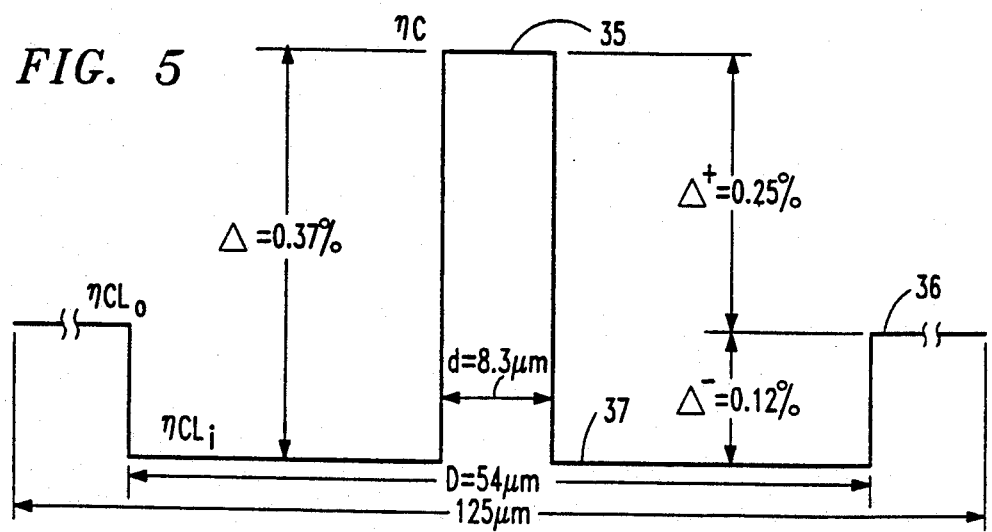
FIG. 5 is a profile representation of the refractive index configuration of a depressed cladding optical fiber of the cable core of this invention.

This problem is overcome by causing each of the optical fibers 25—25 to be characterized by a core 31, and an inner cladding 32 (see FIG. 4) having an index of refraction which is depressed relative to that of an outer cladding 33. Such a fiber is said to have a depressed inner cladding. It has been found that a depressed cladding optical fiber is advantageous in that such a fiber can be designed with a relatively high resistance to optical loss which is induced by microbending. As shown in FIG. 5, the core 31 has a diameter, d, and an index of refraction 35 which has a relative refractive index difference $\Delta+$ with respect to a reference line 36 corresponding to the index of refraction $n_{CLo}$ of the outer cladding 33. The inner cladding 32 has a diameter, D, and an index of refraction $n_{CLi}$ which is designated by the numeral 37 and which has a relatively low refractive index difference $\Delta-$ with respect to the same reference line 36. The overall difference in index of refraction from that of the fiber core to that of the inner cladding is designated $\Delta$.

An advantage of a depressed cladding optical fiber is that the cutoff wavelength, in addition to its dependence on the core diameter, d, and overall refractive index difference $\Delta$, depends on the ratio of the inner cladding diameter to the core diameter, D/d, and the ratio of the inner cladding index depression to the total index difference, $\Delta-/\Delta$. For example, as D/d decreases, the cutoff wavelength decreases. A nominal value of D/d is 6.5, but a useful range may include values as low as about 3. Because the spot size, effective index and zero dispersion wavelength are insensitive to these ratios in the contemplated range thereof, the higher values of $\Delta$ desired for the improved microbending performance can be offset by choosing appropriate values of D/d and $\Delta-/\Delta$ to control the cutoff wavelength. Typical values of D/d and $\Delta-/\Delta$ result in a lowering of the cutoff wavelength by 100 nm or more and therefore single mode operation is achieved in a relatively high $\Delta$ fiber.

In a preferred embodiment, the cable core of this invention includes low dispersion, low loss fibers having a $\Delta$, a core diameter, D/d and $\Delta-/\Delta$ which provide cutoff at sufficiently low wavelengths to guarantee single mode operation at 1.3 $\mu$m. A fiber having an up-doped core with a down-doped cladding can provide a high $\Delta$ and low material dispersion in the vicinity of 1.3 $\mu$m. As set forth in U.S. Pat. No. 4,439,007 which issued on Mar. 27, 1984 in the names P. D. Lazay, et al. and which is incorporated by reference hereinto, a relatively high Δ does not necessarily result in high material dispersion in the vicinity of 1.3 μm when reliance is had on a down-doped cladding. Sufficiently low cutoff wavelengths, low dispersion and a spot size suitable for low loss splicing are obtained by the appropriate choice of d, D/d and Δ−/Δ with a relatively high delta which results in low packaging loss. Typical values of Δ− range between 10 and 40% of Δ. In a preferred embodiment, d=8.3 μm, D=54 μm, Δ+=0.25%, Δ−=0.12% and Δ=0.37%.

Figure 6:
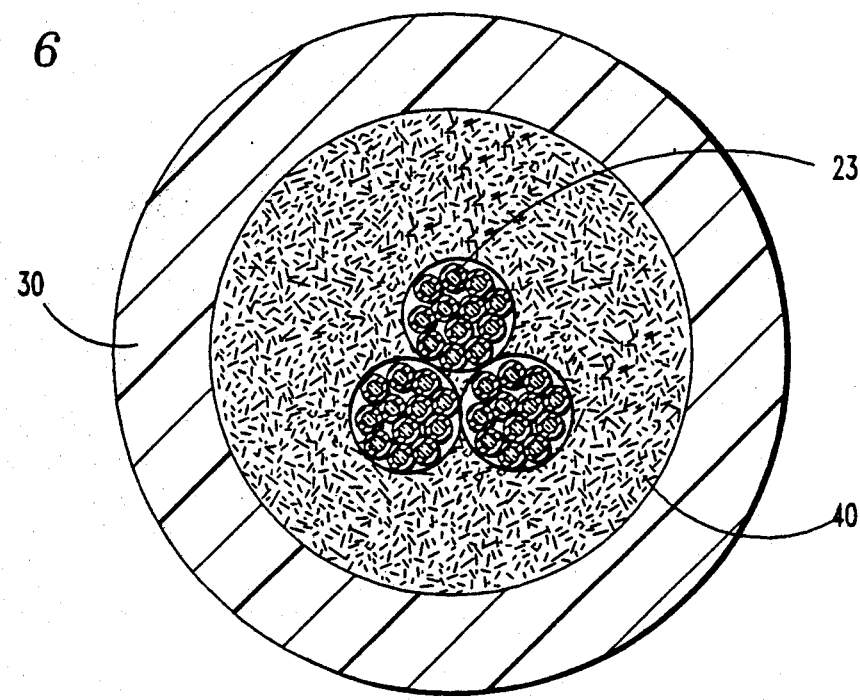
FIG. 6 is an end sectional view of another optical fiber cable core of this invention.

The cable core 20 of this invention may also include waterblocking provisions, such as, for example, a filling material 40 (see FIG. 6). As is seen in FIG. 6, the filling material 40 may be disposed in the tubular member 30 and fill interstices among the bundles 23—23 and among the fibers 25—25 within each bundle. A suitable filling material 40 is a colloidal gel such as that which is disclosed in U.S. Pat. No. 4,701,016 which issued on Oct. 20, 1987 in the names of C. H. Gartside III, A. C. Levy, Bob J. Overton, and Carl R. Taylor and which is incorporated by reference hereinto.

A colloidal gel typically is a semi-liquid substance comprising a thickening agent in a liquid carrier. All types of gelling agents form network structures in which the carrier is held by capillary forces. When a low stress is applied to a gel, the material acts substantially solid-like, but if the stress is above a critical value, the material flows and the viscosity decreases rapidly, a behavior frequently described as thixotropic.

Colloidal gels have been used as communication cable filling compounds. In optical fiber cables, it is essential that, in addition to waterblocking, the filling gel maintains the optical fibers in a low stress state so that signal attenuation is minimized. While the shear modulus has been considered the prime variable for optimizing performance of optical fiber cable filling compounds, a further parameter, the critical stress at which the gel yields, must be controlled.

A grease composition comprising oil, colloidal particle filler, and, optionally, a bleed inhibitor is disclosed in the above-identified Gartside, et al. U.S. Pat. No. 4,701,016. The grease typically has a critical yield stress below 140 Pa at 20° C., preferably below 70, or 35 Pa for some applications, and a shear modulus which is less than about 13 kPa at 20° C. Preferred compositions comprise 77 to 95% b.w. of ASTM type 103, 104A, or 104B paraffinic or naphthenic oil, or polybutene oil; 2 to 15% b.w. of hydrophobic or hydrophilic fumed silica; and optionally, up to 15% b.w. of styrene-rubber or styrene-rubber-styrene block copolymer, or semiliquid rubber.

In an alternate embodiment, the waterblocking provision may include a suitable waterblocking tape or yarn. Such an arrangement is disclosed in U.S. patent application Ser. No. 217,486 which was filed on July 11, 1988 in the names of C. J. Arroyo, J. B. Fluevog, K. Kathiresan and P. D. Patel, and which is incorporated by reference hereinto.

The cable core 20 of this invention may be used in a number of ways. For example, it may be provided with metallic conductors and sheathing so that it can be used along rights-of-way for aerial power transmission systems. Alternately, for example, it may be supplied to an optical fiber cable manufacturer which may apply its own design sheath system thereto.

Figure 7:
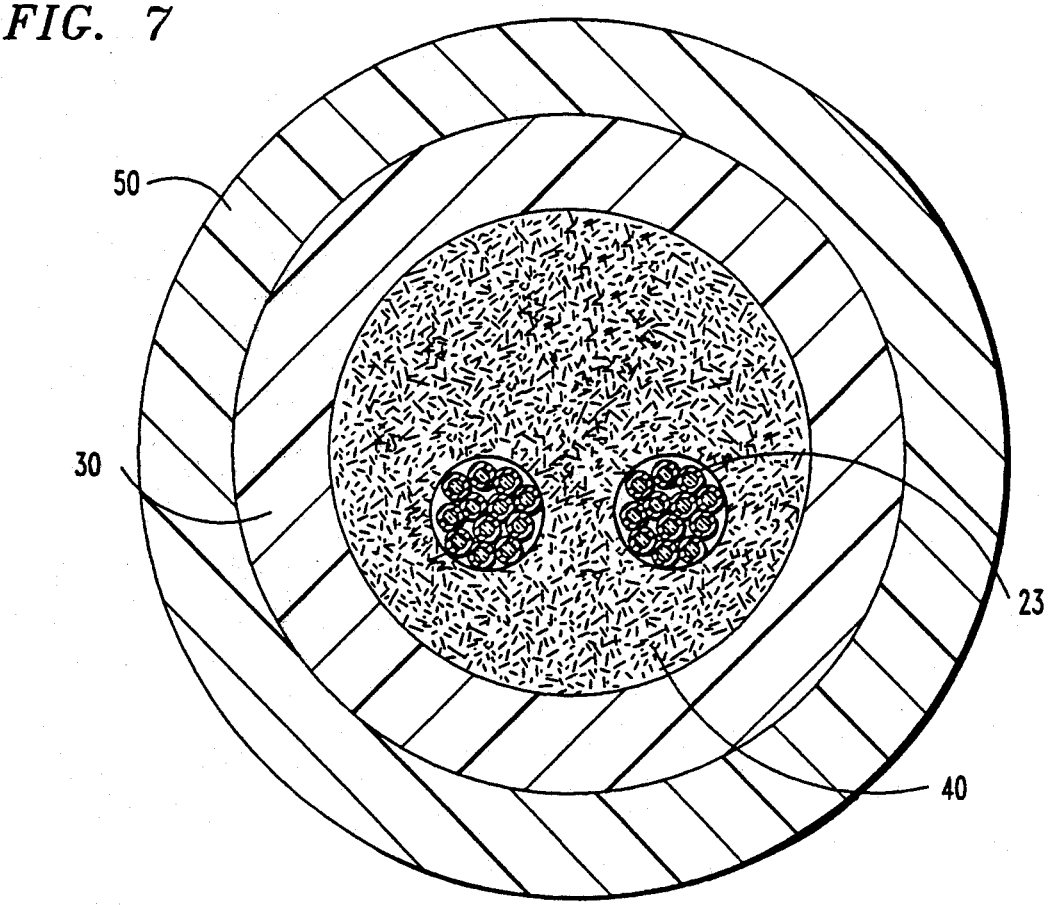
FIG. 7 is an end sectional view of still another embodiment of this invention.

It also is within the scope of this invention to include a tubular member system. Instead of the core comprising a single tubular member, the core may include inner and outer concentric tubular members 30 and 50 (see FIG. 7), the inner one 30 of which may have a relatively low coefficient of friction and the outer one 50 of which is characterized by excellent mechanical properties.

It is to be understood that the above-described arrangements are simply illustrative of the invention. Other arrangements may be devised by those skilled in the art which will embody the principles of the invention and fall within the spirit and scope thereof.

We claim:

1. An optical fiber cable core, which has a longitudinally extending centrally disposed axis, said optical fiber cable core including:

at least one optical fiber transmission medium; and
   a tubular member which has a length and a circular cross section and which encloses said at least one optical fiber transmission medium, said at least one optical fiber transmission medium having a length in excess over the length of the tubular member wherein the excess length and the cross sectional area of the optical fiber transmission medium in said tubular member and the inner diameter of said tubular member being such as to avoid bending losses caused by excessive curvature in the optical fiber transmission medium and by excessive interactive engagement of the optical fiber transmission medium with an inner wall of the tubular member and wherein said tubular member comprises a plastic material which is characterized by a relationship between applied load and strain which is substantially linear up to a strain corresponding to the excess length of the optical fiber transmission medium at a given temperature.

2. The optical fiber cable core of claim 1, wherein the length of said optical fiber transmission medium exceeds the length of said tubular member by as much as one percent.

3. The optical fiber cable core of claim 1, wherein said plastic material of said tubular member comprises polybutylene terephthalate.

4. The optical fiber cable core of claim 1, which also includes a waterblocking material which is disposed within said tubular member.

5. The optical fiber cable core of claim 4, wherein said waterblocking material includes a filling material which is disposed within said tubular member.

6. The optical fiber cable core of claim 5, wherein said filling material has a critical yield stress which is not greater than about 70 Pa at 20° C. and a shear modulus less than about 13 kPa at 20° C.

7. The optical fiber cable core of claim 6, wherein the filling material is a composition of matter which comprises:

(a) 77 to 95% by weight of an oil, selected from the group consisting of:
       (i) paraffinic oil having a minimum specific gravity of about 0.86 and a pour point less than −4° C., and being of ASTM type 103, 104A or 104B;
       (ii) naphthenic oil having a minimum specific gravity of about 0.86 and pour point less than −4° C., and being of ASTM type 103, 104A, or 104B;
       (iii) polybutene oil having a minimum specific gravity of about 0.83 and a pour point less than 18° C.; and
       (iv) any mixture thereof; and
   (b) 2 to 15% by weigth of hydrophobic fumed silica colloidal particles.

8. The optical fiber cable core of claim 6, wherein the filling material is a composition of matter comprising:
  (a) 77 to 95% by weight of an oil selected from the group consisting of:
    (i) paraffinic oil having a minimum specific gravity of about 0.86 and a pour point of less than −4° C., and being of ASTM type 103, 104A, or 104B;
    (ii) naphthenic oil having a minimum specific gravity of about 0.86 and a pour point of less than −4° C., and being of ASTM type 103, 104A or 104B;
    (iii) polybutene oil having a minimum specific gravity of about 0.83 and a pour point of less than 18° C.;
    (iv) triglyceride-based vegetable oil,
    (v) polypropylene oil,
    (vi) chlorinated paraffin oil having a chlorine content between about 30 and 75% by weight and a viscosity at 25° C. of between 100 and 10,000 cps, and
    (vii) polymerized esters; and
    (viii) any mixture thereof; and
  (b) 2 to 15% by weight colloidal particles selected from the group consisting of hydrophobic fumed silica, hydrophilic fumed silica, precipitated silica, and clay, the colloidal particles having a BET surface area in the range from about 50 to about 400 $m^2/g$.

9. The optical fiber cable core of claim 8, wherein the composition of matter further comprises up to 15% by weight of a bleed inhibitor selected from the group consisting of styrene-rubber and styrene-rubber-styrene block copolymers having a styrene/rubber ratio between about 0.1 and 0.8, semiliquid rubber having a Flory molecular weight between 20,000 and 70,000, butyl rubber, ethylene-propylene rubber, ethylene-propylene dimer rubber, chlorinated butyl rubber having a Mooney viscosity at 100° C. between about 20 and 90, and depolymerized rubber having a viscosity at 38° C., between about 40,000 and 400,000 cps, with the oil, the colloidal particles, and the bleed inhibitor comprising at least 99% by weight of the composition of matter.

10. The optical fiber cable core of claim 9, wherein the filling material comprises between about 90 to 95% b.w. of oil and about 2 to about 10% b.w. of colloidal particles.

11. The optical fiber cable core of claim 1, wherein said cable core comprises at least one bundle of optical fibers.

12. The optical fiber cable core of claim 11, wherein said bundle is enclosed by a binder which is wrapped helically about each bundle.

13. The optical fiber cable core of claim 11, wherein said optical fiber bundle includes a plurality of coated optical fibers and wherein the single tubular member which encloses the core has a cross-sectional area defined by an inner wall of said tubular member which is such that the ratio of the cross sectional area of the plurality of coated optical fibers to the cross sectional area within said tubular member does not exceed a predetermined value.

14. The optical fiber cable core of claim 13, wherein said predetermined value does not exceed about 0.5.

15. The optical fiber cable core of claim 1, wherein each said optical fiber transmission medium includes a core, an outer cladding, and an inner cladding having an index of refraction which is less than that of the outer cladding and being characterized by a difference between the indices of refraction of said core and of said inner cladding which is sufficiently high to cause said each optical fiber transmission medium to provide microbending resistance with the ratio of the inner cladding diameter to the core diameter, which ratio is sufficiently large to avoid affecting the dispersive properties of the optical fiber transmission medium, and the ratio of the difference in the indices of refraction of the inner and the outer claddings to the difference in the indices of refraction between the core and the inner cladding being such that each said optical fiber transmission medium is capable of operation in a single mode fashion at a predetermined wavelength.

16. The optical fiber cable core of claim 15, wherein the difference between the indices of refraction of the inner and outer claddings is in the range of about 10 to 40% of the difference between the indices of refraction of the core and the inner cladding, and wherein the ratio of the inner cladding diameter to the core diameter is not less than about 3.

17. The optical fiber cable core of claim 1, wherein said tubular member is a first tubular member and said optical fiber cable core also includes a second tubular member which is disposed concentrically about and in engagement with said first tubular member.

* * * * *